(12) United States Patent
Dickie et al.

(10) Patent No.: US 8,348,017 B2
(45) Date of Patent: *Jan. 8, 2013

(54) REDUCED GULP FLUID RESERVOIR

(75) Inventors: Paul A. Dickie, Newington, CT (US); Larry W. Spires, Unionville, CT (US)

(73) Assignee: United Technologies Corporation, Hartford, CT (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/324,693

(22) Filed: Dec. 13, 2011

(65) Prior Publication Data
US 2012/0080272 A1    Apr. 5, 2012

Related U.S. Application Data

(63) Continuation of application No. 12/233,300, filed on Sep. 18, 2008.

(51) Int. Cl.
| F01D 25/20 | (2006.01) |
| F01D 25/18 | (2006.01) |
| F01M 11/03 | (2006.01) |
| F01M 1/02 | (2006.01) |

(52) U.S. Cl. .................. 184/6.11; 184/6.28; 137/561 R

(58) Field of Classification Search .................. 184/6.11, 184/6.4, 6.23, 6.24, 6.28; 137/109, 561 R; 55/290; 440/88 L
See application file for complete search history.

(56) References Cited

U.S. PATENT DOCUMENTS

| 1,470,804 | A |  | 10/1923 | Buckingham |
| 2,402,467 | A |  | 6/1946 | Thompson |
| 4,280,678 | A |  | 7/1981 | Roberts |
| 4,531,358 | A |  | 7/1985 | Smith |
| 4,779,413 | A |  | 10/1988 | Mouton |
| 4,891,934 | A |  | 1/1990 | Huelster |
| 4,947,963 | A |  | 8/1990 | Aho, Jr. |
| 4,976,335 | A |  | 12/1990 | Cappellato |
| 5,037,340 | A | * | 8/1991 | Shibata ........................ 440/88 L |
| 5,121,599 | A |  | 6/1992 | Snyder et al. |
| 6,113,676 | A | * | 9/2000 | Kumpulainen .................. 96/193 |
| 6,463,819 | B1 |  | 10/2002 | Rago |
| 6,926,121 | B2 |  | 8/2005 | Gates et al. |
| 2006/0056958 | A1 |  | 3/2006 | Gaines et al. |
| 2008/0011550 | A1 |  | 1/2008 | Dunn et al. |

FOREIGN PATENT DOCUMENTS

| DE | 102006055760 A1 | 5/2008 |
| JP | H02105506 U | 8/1990 |
| JP | 6042323 A | 2/1994 |
| JP | 2002004808 A | 1/2002 |
| WO | 9738259 A1 | 10/1997 |

OTHER PUBLICATIONS

Extended European Search Report in foreign counterpart Application No. 09252217.6, dated Nov. 15, 2011.

* cited by examiner

Primary Examiner — Michael Mansen
Assistant Examiner — Robert T Reese
(74) Attorney, Agent, or Firm — Kinney & Lange, P.A.

(57) ABSTRACT

An assembly includes a reservoir for holding a fluid, and a scavenge passage connected to the reservoir at a reservoir inlet. The scavenge passage returns the fluid from a delivery location to the reservoir. A bleed passage is connected in fluid communication between the reservoir and the scavenge passage.

20 Claims, 6 Drawing Sheets

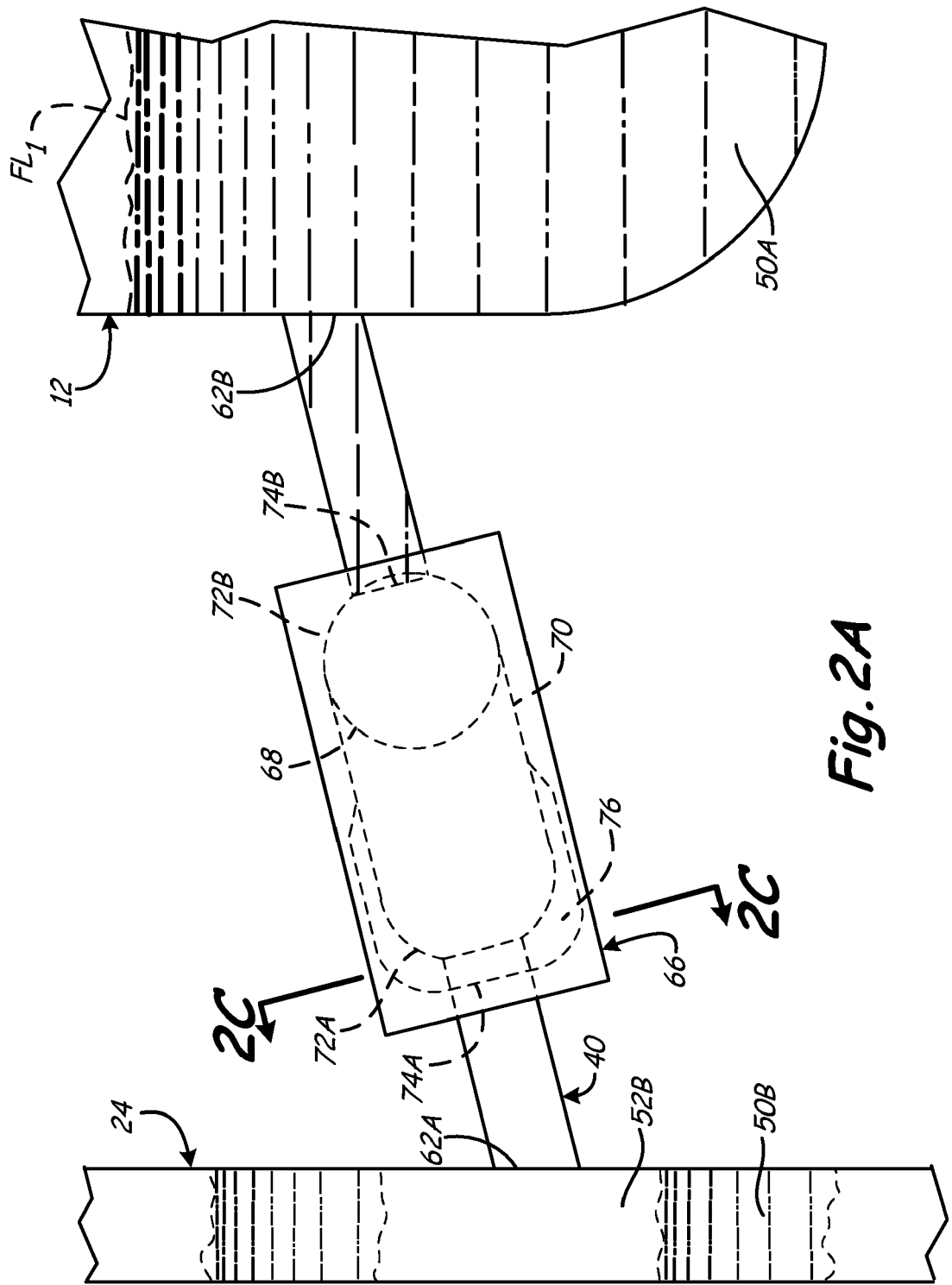

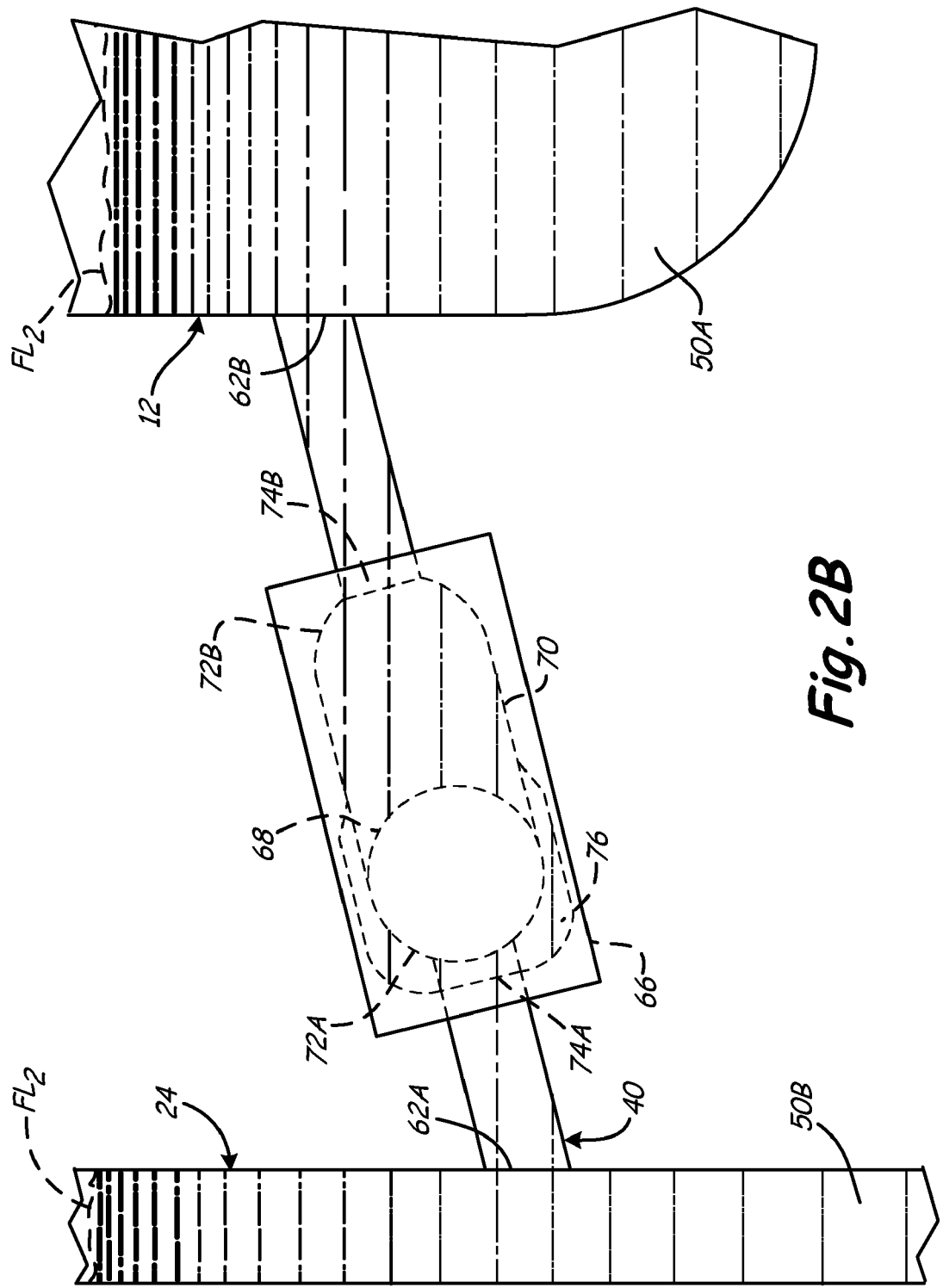

REDUCED GULP FLUID RESERVOIR

CROSS-REFERENCE TO RELATED APPLICATION

This is a continuation of U.S. patent application Ser. No. 12/233,300, entitled "REDUCED GULP FLUID RESERVOIR," filed Sep. 12, 2008 by Paul A. Dickey et al.

BACKGROUND

The present invention relates to reservoirs, and more particularly, to fluid reservoirs for use in gas turbine engines.

In many gas turbine engines, a fluid reservoir is used to store lubricating oil for engine components. A supply pump attached to a supply passage takes fluid from the fluid reservoir to the engine components, and a scavenge pump attached to a scavenge passage returns the fluid from the engine components to the fluid reservoir.

Typically, the scavenge pump returns a quantity of air along with the fluid. When the engine is shut down, the supply pump and scavenge pump also slow down and eventually stop. During the slow down, lubricated, moving components of the engine also slow down, and the fluid on those components tends to fall to scavenge pick-up locations more quickly. This effect allows the scavenge pump to return more fluid to the fluid reservoir than the supply pump removes from the fluid reservoir during the slow down. Additionally, when a lubrication system is pressurized, the system typically depressurizes during the shut down. This causes compressed air in the scavenge passage to expand, forcing additional fluid to enter the fluid reservoir during and immediately after shut down.

After shut down, any fluid remaining in the scavenge passage eventually settles at the lowest point and the remaining air rises. The scavenge passage tends to hold a relatively large quantity of air leading into the fluid reservoir when it is shut down. When the engine is started up again, the supply pump pumps fluid out of the fluid reservoir. Because the scavenge passage is filled mostly with air at that time, the scavenge pump, essentially, pumps air into the fluid reservoir to replace the space previously occupied by fluid. When this happens, the fluid level in the fluid reservoir drops, sometimes substantially. This drop in the fluid level is sometimes called "gulp." Fluid reservoirs are typically designed to be large enough to hold enough fluid to accommodate the "gulp." However, a larger fluid reservoir undesirably adds weight to the entire system.

SUMMARY

According to the present invention, an assembly includes a reservoir for holding a fluid, and a scavenge passage connected to the reservoir at a reservoir inlet. The scavenge passage returns the fluid from a delivery location to the reservoir. A bleed passage is connected in fluid communication between the reservoir and the scavenge passage.

BRIEF DESCRIPTION OF THE DRAWINGS

FIG. 2A is a side view of the bleed passage and ball valve of an additional embodiment of the present invention when operational.

FIG. 2B is a side view of the bleed passage and ball valve of FIG. 2A when at rest.

DETAILED DESCRIPTION

In general, the present invention provides a lubricating system having a connection passage between a reservoir and a scavenge passage that allows some fluid in the reservoir to flow back to the scavenge passage when the lubrication system is not in operation. This increases the amount of fluid and reduces the amount of air in the scavenge passage immediately prior to startup. When the startup occurs, there is a quantity of fluid present in the scavenge passage to immediately replace the fluid that is leaving the reservoir through the supply passage. Thus, the lubrication system's "gulp" is relatively small during startup. Because the "gulp" is relatively small, the size and weight of the reservoir can be reduced compared to systems with a larger "gulp."

Figure 1A:
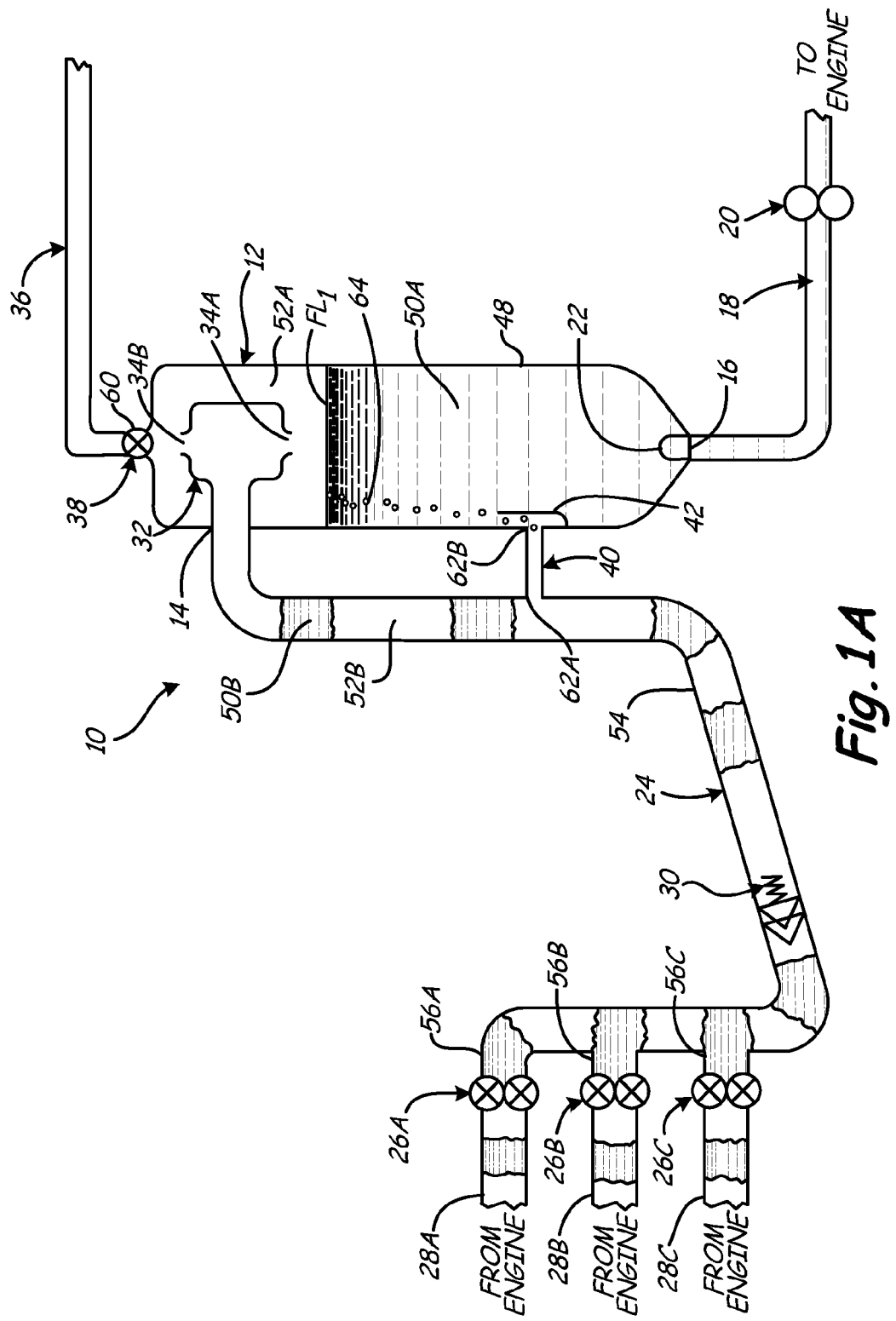
FIG. 1A is a schematic view of the fluid storage apparatus of the present invention when operational.

FIG. 1A is a schematic view of fluid storage apparatus 10 while operational. Fluid storage apparatus 10 includes reservoir 12, reservoir inlet 14, reservoir outlet 16, supply passage 18, supply pump 20, screen 22, scavenge passage 24, scavenge pumps 26A-26C, scavenge pump sub-passages 28A-28C, scavenge check valve 30, deaerator 32, deaerator bottom outlet 34A, deaerator top outlet 34B, breather 36, reservoir pressurization valve 38, bleed passage 40, and shield 42.

In the illustrated embodiment, fluid storage apparatus 10 is configured to store lubricating oil for use in a gas turbine engine (not shown) for supplying lubricant to various engine components and for scavenging lubricant from the same. In an alternative embodiment, fluid storage apparatus 10 can be used to supply and scavenge any fluid to and from a delivery location.

In the illustrated embodiment, reservoir 12 is a generally cylindrical container with reservoir wall 48 that encloses a cavity holding fluid 50A at a bottom portion of reservoir 12 and air 52A at a top portion of reservoir 12. In alternative embodiments, reservoir 12 can be of a shape contoured to fit within the space constraints of a larger structure such as a gas turbine engine.

Supply passage 18 is connected to reservoir 12 at reservoir outlet 16. Supply passage 18 is hollow tube with an opening at each end. Supply pump 20 is attached in-line with supply passage 18, downstream of reservoir outlet 16. Supply pump 20 pumps fluid 50A from reservoir 12 to various gas turbine engine components. Screen 22 is attached to supply passage 18 at reservoir outlet 16. Screen 22 limits debris from flowing through reservoir outlet 16.

Scavenge passage 24 is connected to reservoir 12 at reservoir inlet 14. Reservoir inlet 14 is a hole in reservoir wall 48. Scavenge passage 24 is a hollow tube having scavenge passage wall 54 and an opening at reservoir inlet 14. Scavenge pump sub-passages 28A-28C are also hollow tubes that connect to scavenge passage wall 54 at scavenge passage interfaces 56A-56C, respectively. Scavenge pumps 26A-26C are attached in-line with scavenge pump sub-passages 28A-28C, upstream of reservoir inlet 14. Scavenge pumps 26A-26C can pump fluid 50B and air 52B from the various gas turbine engine components to reservoir 12. In the illustrated embodiment, fluid 50B travels to reservoir 12 in packets separated by and intermixed with air 52B. Fluid 50B in scavenge passage 24 is the same composition as fluid 50A in reservoir 12 except that fluid 50B is partially mixed with air 52B whereas fluid 50A is substantially separate from air 52A. Scavenge check valve 30 is attached in-line with scavenge passage 24. Scavenge check valve 30 allows fluid flow from scavenge pumps 26A-26C to reservoir 12 but limits fluid flow in the opposite direction. Scavenge passage 24 has a generally ascending slope from scavenge check valve 30 to reservoir inlet 14.

Deaerator 32 is located substantially inside the cavity enclosed by reservoir wall 48 and is attached to the end of scavenge passage 24. Deaerator 32 is configured to separate a mixture of fluid 50B and air 52B into substantially separate flows. For clarity, fluid 50A and air 52A refer to fluid and air after deaeration and fluid 50B and air 52B refer to fluid and air prior to deaeration. Deaerator bottom outlet 34A and deaerator top outlet 34B are holes in deaerator 32 and can be circular, slotted, or another shape. Breather 36 is a hollow tube attached to reservoir 12 at breather interface 60. Reservoir pressurization valve 38 is also attached to reservoir 12 at breather interface 60. Reservoir pressurization valve 38 allows air 52A to exit reservoir 12 when a given pressure is exceeded.

During operation, fluid 50B and air 52B are fed into deaerator 32 from scavenge passage 24 through reservoir inlet 14. After removing air 52B from fluid 50B, deaerator 32 then directs the more homogeneous fluid 50A through deaerator bottom outlet 34A and directs air 52A through deaerator top outlet 34B into reservoir 12. Most of air 52A is then directed through reservoir pressurization valve 38 to breather 36. Reservoir pressurization valve 38 includes a bleed hole (not shown) that relieves the pressure in fluid storage apparatus 10 after shut down. In further embodiments, deaerator 32 can have virtually any shape and configuration that is compatible with the present invention.

Bleed passage 40 is a hollow tube with openings at both ends. Bleed passage 40 is connected to scavenge passage 24 through a hole in scavenge passage wall 54 at first bleed passage interface 62A, and connected to reservoir 12 through a hole in reservoir wall 48 at second bleed passage interface 62B. First and second bleed passage interfaces 62A and 62B are located vertically lower than reservoir inlet 14. Bleed passage 40 can have a diameter that is smaller than a diameter of scavenge passage 24. In the illustrated embodiment, bleed passage 40 allows fluid 50A and 50B as well as air 52A and 50B to pass freely between scavenge passage 24 and reservoir 12. The direction of flow through bleed passage 40 depends on a pressure gradient between first bleed passage interface 62A and second bleed passage interface 62B. When supply pump 20 and scavenge pumps 26A-26C are in operation, as shown in FIG. 1A, fluid 50B and air 52B flow from scavenge passage 24 to reservoir 12 through bleed passage 40, though a substantially greater quantity of fluid 50B and air 52B flow from scavenge passage 24 to reservoir 12 through reservoir inlet 14. While fluid storage apparatus 10 is operational, a surface of fluid 50A defines an operational fluid level $FL_1$.

When air 52B flows from scavenge passage 24 to reservoir 12 through bleed passage 40, air bubbles 64 can form in fluid 50A. Shield 42 can be attached to reservoir wall 48 below and on both sides of bleed passage interface 62B. Shield 42 can be positioned between bleed passage interface 62B and reservoir outlet 16. Shield 42 and reservoir wall 48 combine to form a generally cup shaped structure with an opening at the top. Shield 42 directs air bubbles 64 away from reservoir outlet 16 and toward air 52A at the top of reservoir 12. In alternative embodiments, shield 42 can be any structure that impedes the flow of air bubbles 64 to reservoir outlet 16.

Figure 1B:
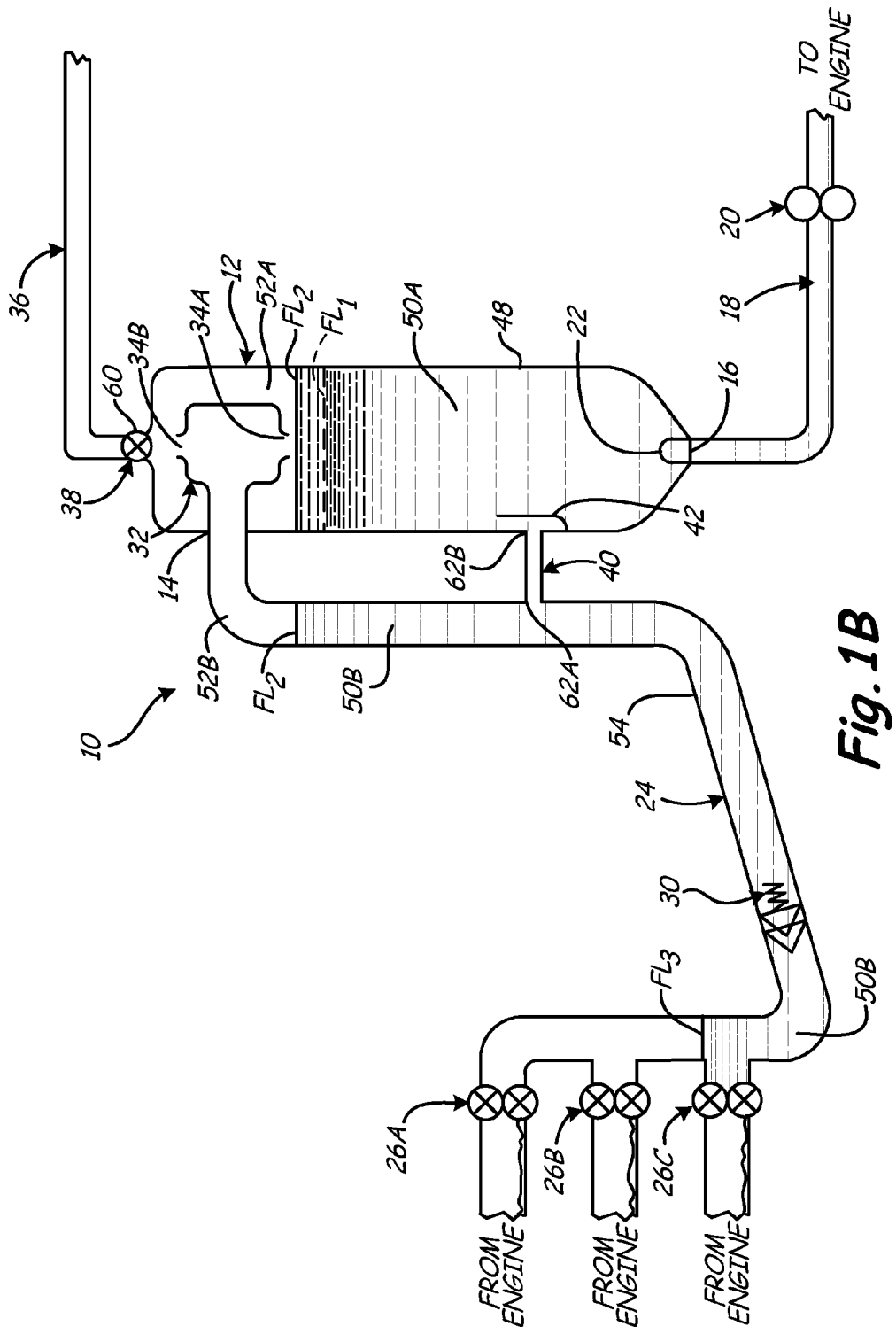
FIG. 1B is a schematic view of the fluid storage apparatus of FIG. 1A when at rest.

FIG. 1B is a schematic view of fluid storage apparatus 10 while at rest (i.e. not operational). All physical structures of fluid storage apparatus 10 shown in FIG. 1B are essentially the same as in FIG. 1A, except that scavenge pumps 26A-26C and supply pump 20 are at rest. Because all pumps 20 and 26A-26C are at rest, fluid 50A and 50B and air 52A and 52B are also at rest.

As a gas turbine engine slowly spools down, scavenge pumps 26A-26C typically return more fluid 50B to reservoir 12 than supply pump 20 removes from reservoir 12. This can occur when moving components of the engine also slow down, and fluid 50B on those components tends to fall to scavenge pick-up locations more quickly. This effect allows scavenge pumps 26A-26C to return more fluid 50B to reservoir 12 than the amount of fluid 50A that supply pump 20 removes from reservoir 12 during the slow down. Additionally, in an embodiment where fluid storage apparatus 10 is pressurized, fluid storage apparatus 10 typically depressurizes during the shut down. This causes compressed air 52B in scavenge passage 24 to expand, forcing additional fluid 50B to enter reservoir 12 during and immediately after shut down. Consequently, the fluid level in reservoir 12 increases above the operational fluid level $FL_1$. As scavenge pumps 26A-26C slow and eventually stop, pressure in scavenge passage 24 decreases and fluid 50A in reservoir 12 is allowed to flow through bleed passage 40 into scavenge passage 24 until equilibrium is reached. At equilibrium, the level of fluid 50A in reservoir 12 and the level of fluid 50B in scavenge passage 24 are both at substantially the same rest fluid level $FL_2$. Scavenge check valve 30 prevents fluid 50B from flowing back through scavenge passage 24 past a certain point. Consequently, fluid 50B upstream from check valve 30 is at pre-check valve fluid level $FL_3$, which is lower than rest fluid level $FL_2$ (in the vertical direction) in the illustrated embodiment. Under normal operating conditions, fluid level $FL_2$ is equal to or higher than each of first and second bleed passage interfaces 62A and 62B.

Figure 1C:
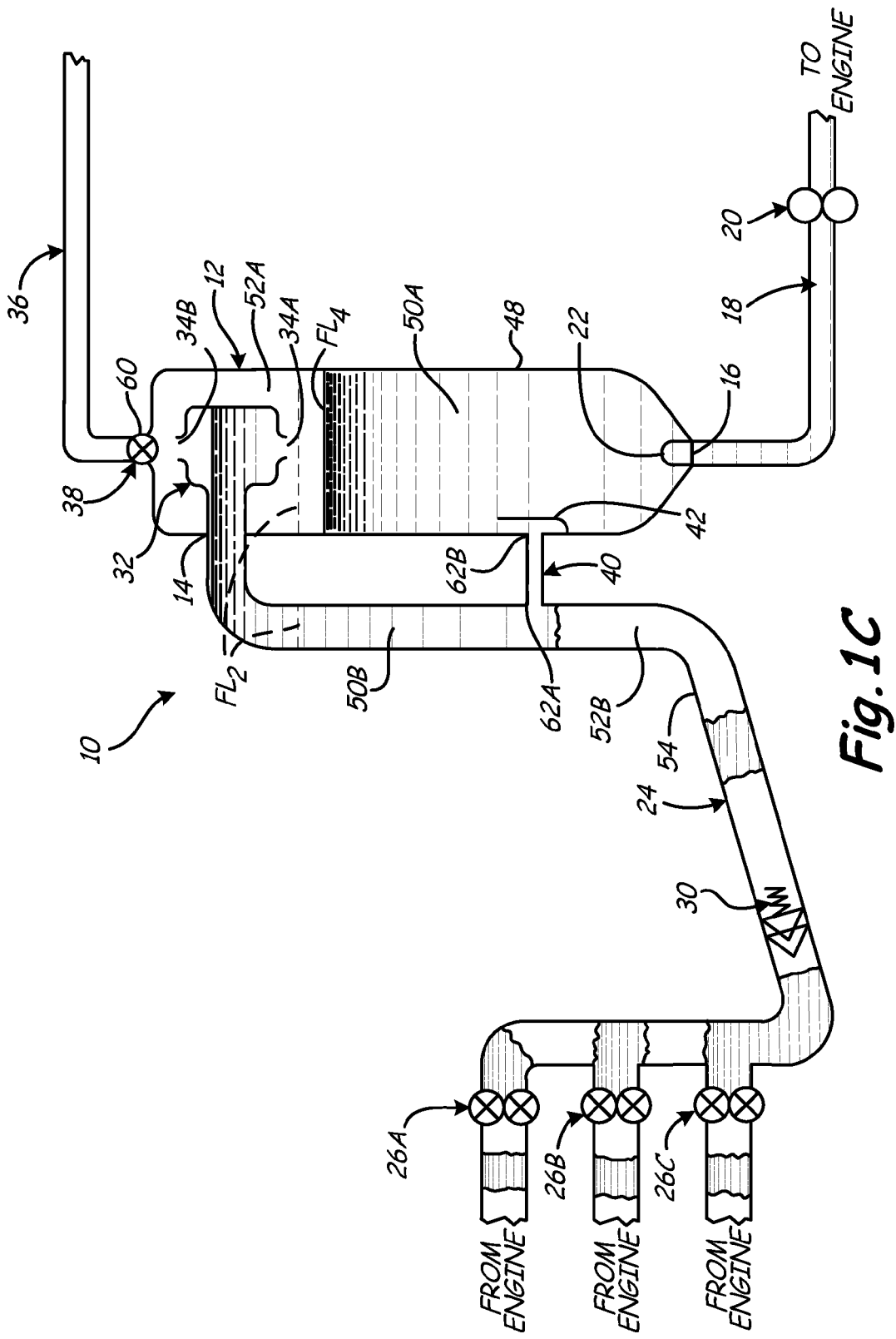
FIG. 1C is a schematic view of the fluid storage apparatus of FIG. 1A shortly after startup.

FIG. 1C is a schematic view of fluid storage apparatus 10 shortly after startup. At startup, supply pump 20 begins pumping fluid 50A from reservoir 12 to engine components (i.e. delivery locations). Because fluid 50A is being removed from reservoir 12, the fluid level of fluid 50A in reservoir 12 would have a tendency to drop below rest fluid level $FL_2$. Also at startup, scavenge pumps 26A-26C begin pumping fluid 50B and air 52B. In the illustrated embodiment, fluid storage apparatus 10 is servicing gas turbine engine components that have very little fluid in them prior to startup so scavenge pumps 26A-26C pump mostly air 52B at first. Nonetheless, this mixture of air 52B and a small amount of fluid 50B pushes the quantity of fluid 52B that was already stored in scavenge passage 24 into reservoir 12. Thus, when supply pump 20 removes fluid 50A from reservoir 12 at startup, the fluid loss is almost immediately replaced by fluid 50B from scavenge passage 24.

In the illustrated embodiment, rest fluid level $FL_2$ drops only a small amount to startup fluid level $FL_4$ shortly after startup (sometimes called "gulp," as explained above). In an alternative embodiment, the size of scavenge passage 24 is increased to hold more fluid 50B. If scavenge passage 24 is sufficiently large enough, it will hold enough fluid 50B to supply to reservoir 12 an amount equal to the amount of fluid 50B removed from reservoir 12 at startup. Consequently, startup fluid level $FL_4$ would be substantially equal to rest fluid level $FL_2$, constituting approximately zero gulp.

FIGS. 2A and 2B are side views of bleed passage 40 and ball valve 66 of an additional embodiment of the present invention. FIG. 2A is a view of bleed passage 40 and ball valve 66 when the engine is operational and FIG. 2B is a view of bleed passage 40 and ball valve 66 when the engine is at rest (i.e. not operational). FIG. 2A and 2B show bleed passage 40 connected to scavenge passage 24 at first bleed passage interface 62A and also connected to reservoir 12 at second bleed passage interface 62B.

Ball valve 66 is connected in-line with bleed passage 40 between first and second bleed passage interfaces 62A and 62B. Ball valve 66 includes ball 68, ball track 70, first ball track limit 72A, second ball track limit 72B, first orifice 74A and second orifice 74B. Ball 68 can moved along ball track 70 inside ball valve 66. Ball 68 can move freely along ball track 70 from first ball track limit 72A to second ball track limit 72B. First ball track limit 72A is vertically lower than second ball track limit 72B. First ball track limit 72A is a point on ball track 70 proximate first bleed passage interface 62A, and second ball track limit 72B is a point on ball track 70 proximate second bleed passage interface 62B. First orifice 74A is located near but spaced apart from first ball track limit 72A. Second orifice 74B is located at second ball track limit 72B. A diameter of ball 68 is greater than a diameter of second orifice 74B.

When fluid storage apparatus 10 is operational as shown in FIG. 2A, scavenge pumps 26A-26C pump fluid 50B and air 52B through scavenge passage 24 toward first bleed passage interface 62A. This creates a higher pressure at first bleed passage interface 62A than at second bleed passage interface 62B. This pressure gradient pushes ball 68 to second ball track limit 72B and against second orifice 74B. The contact between ball 68 and second ball track limit 72B obstructs second orifice 74B and limits flow through second orifice 74B.

When scavenge pumps 26A-26C are at rest, pressure at first bleed passage interface 62A is not significantly higher than pressure at second bleed passage interface 62B. Because a pressure gradient is not forcing ball 68 against second orifice 74B, gravity moves ball 68 from second ball track limit 72B to the vertically lower position of first ball track limit 72A. Ball 68 is spaced apart from first orifice 74A when at first ball track limit 72A.

In an alternative embodiment, first ball track limit 72A is substantially vertically level with second ball track limit 72B. When the level of fluid 50A in reservoir 12 is higher than the level of fluid 50B in scavenge passage 24, pressure at second bleed passage interface 62B is greater than pressure at first bleed passage interface 62A. This pressure gradient pushes ball 68 to first ball track limit 72A.

Figure 2C:
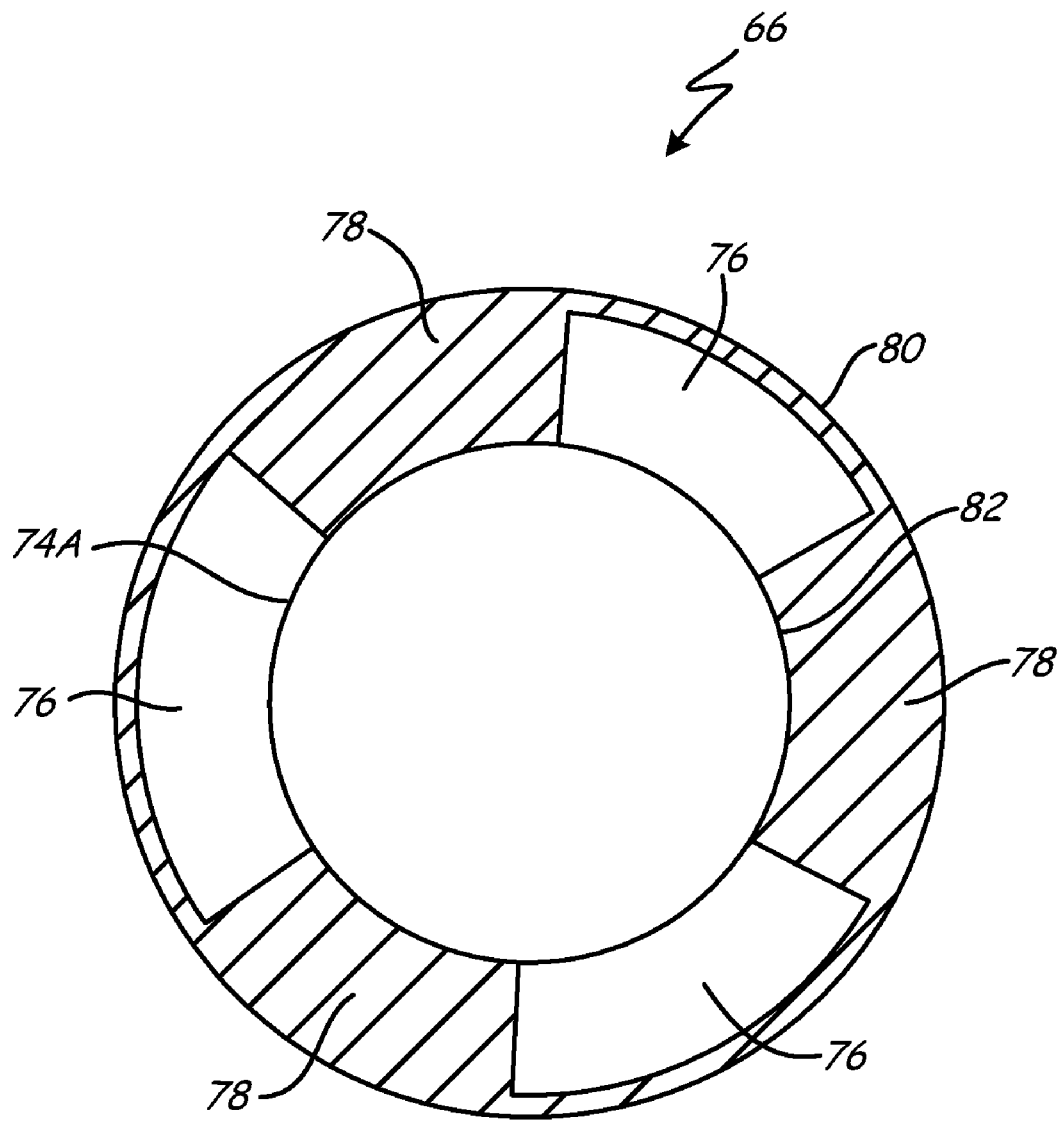
FIG. 2C is a sectional view of the ball valve taken along line 2C-2C of FIG. 2A.

FIG. 2C is a sectional view of ball valve 66 taken along line 2C-2C of FIG. 2A. Ball valve 66 has side passages 76 circumferentially interspaced by lands 78. Side passages 76 are defined by ball valve outer wall 80 at a perimeter and are open at an interior. Lands 78 are defined between ball valve outer wall 80 at a perimeter and by inner boundary 82 at an interior. Each of lands 78 has substantially the same cross sectional area. In FIG. 2C, an effective diameter of inner boundary 82 is less than a diameter of ball 68 to prevent ball 68 from exceeding first ball track limit 72A.

When ball 68 is at first ball track limit 72A, side passages 76 allow fluid 50A to flow from reservoir 12, through second orifice 74B, through bleed passage 40, around ball 66, through first orifice 74A, and into scavenge passage 24. As explained above in reference to FIG. 1B, fluid 50A flows in this manner until the fluid level in both scavenge passage 24 and reservoir 12 are at the same rest fluid level $FL_2$.

In an alternative embodiment, ball valve 66 could be replaced by a low pressure actuating valve that reduces back flow. In yet another alternative embodiment, ball valve 66 could be replaced by nearly any type of check valve that limits fluid flow in a first direction but allows fluid flow in a second direction.

Although the present invention has been described with reference to preferred embodiments, workers skilled in the art will recognize that changes may be made in form and detail without departing from the spirit and scope of the invention. For example, in an apparatus where air bubbles pose little or no problem, the invention can be employed without using a shield and/or ball valve. Moreover, in applications where debris poses little or no problem, the invention can be employed without using a screen on a supply passage.

What is claimed is:

1. An assembly comprising:
    a reservoir for holding a fluid;
    a scavenge passage connected to the reservoir at a reservoir inlet for returning the fluid from a delivery location to the reservoir; and
    a bleed passage connected in fluid communication between the scavenge passage at a first bleed passage interface and the reservoir at a second bleed passage interface that is different than the reservoir inlet, wherein the second bleed passage interface connects the bleed passage directly to the reservoir, thus creating a bleed passage flow path that bypasses the reservoir inlet.

2. The assembly of claim 1, wherein the reservoir inlet is located vertically higher than the second bleed passage interface.

3. The assembly of claim 1, and further comprising a bleed passage valve operably connected to the bleed passage, wherein the bleed passage valve limits fluid flow from the scavenge passage to the reservoir through the bleed passage and allows fluid flow from the reservoir to the scavenge passage.

4. An assembly comprising:
    a reservoir for holding a fluid;
    a supply passage connected to the reservoir for supplying the fluid to a delivery location;
    a scavenge passage connected to the reservoir at a reservoir inlet for returning the fluid from the delivery location to the reservoir; and
    a bleed passage connected in fluid communication between the scavenge passage at a first bleed passage interface and the reservoir at a second bleed passage interface that is different than the reservoir inlet, wherein the bleed passage is connected to the scavenge passage at the first bleed passage interface upstream from the reservoir inlet and is configured to allow fluid transfer from the reservoir to the scavenge passage bypassing the reservoir inlet, wherein the second bleed passage interface connects the bleed passage directly to the reservoir.

5. The assembly of claim 4, wherein the fluid is a lubricant.

6. The assembly of claim 4, further comprising a scavenge pump operably connected to the scavenge passage for pumping the fluid from the delivery location to the reservoir.

7. The assembly of claim 6, and further comprising:
    a scavenge check valve operably connected to the scavenge passage between the scavenge pump and the reservoir to prevent back-flow.

8. The assembly of claim 7, wherein the scavenge passage has a generally ascending slope from the scavenge check valve to the reservoir inlet.

9. The assembly of claim 6, wherein the scavenge passage has a generally ascending slope from the scavenge pump to the reservoir inlet.

10. The assembly of claim 6, and further comprising a bleed passage valve operably connected to the bleed passage, wherein the bleed passage valve reduces fluid flow from the scavenge passage to the reservoir through the bleed passage and allows fluid flow from the reservoir to the scavenge passage.

11. The assembly of claim 10, wherein the bleed passage valve comprises a ball valve, the ball valve comprising:
an orifice;
a ball that is larger than the orifice and situated near the orifice; and
a ball track allowing the ball to move between a first position located adjacent to the orifice such that the ball at least partially blocks fluid flow through the orifice and a second position spaced from the orifice to allow fluid flow through the orifice and around the ball.

12. The assembly of claim 4, further comprising an air shield positioned between the bleed passage and the supply passage, the air shield impeding air from flowing from the bleed passage to the supply passage through the reservoir.

13. The assembly of claim 12, wherein the air shield is attached to the reservoir at a location closer to the bleed passage than the supply passage.

14. The assembly of claim 4, further comprising a deaerator operably connected to the reservoir inlet for separating air from the fluid returned from the scavenge passage, wherein the second bleed passage interface is not connected to the deaerator.

15. The assembly of claim 4, further comprising a breather and a reservoir pressurization valve attached to the breather for allowing air to escape the reservoir when a reservoir pressure exceeds an operating pressure and for allowing the reservoir pressure to decay after shut-down.

16. The assembly of claim 4, wherein a diameter of the bleed passage is less than a diameter of the scavenge passage and wherein no valve is positioned along the bleed passage.

17. The assembly of claim 4, wherein the scavenge passage returns pockets of oil separated from each other by a gas.

18. The assembly of claim 4, wherein the delivery location is a component for a gas turbine engine.

19. A method for circulating lubricant in a gas turbine engine, the method comprising:
pumping the lubricant from a reservoir to an engine component through a supply passage with a supply pump;
scavenging air and the lubricant from the engine component to a deaerator through a scavenge passage with a scavenge pump;
separating the lubricant from the air in the deaerator, exhausting the air to the atmosphere, and returning the lubricant to the reservoir; and
periodically stopping the supply pump and the scavenge pump to reduce the scavenge passage pressure so that the lubricant flows along a bleed passage flow path from the reservoir into the scavenge passage through a bleed passage connected at a first bleed passage interface to the scavenge passage and at a second bleed passage interface to the reservoir until a scavenge passage lubricant level is substantially equal to a reservoir lubricant level, wherein the second bleed passage interface connects the bleed passage directly to the reservoir,
wherein the scavenged lubricant flows into the reservoir through a reservoir inlet, and wherein the bleed passage flow path bypasses the deaerator and the reservoir inlet.

20. The method of claim 19, and further comprising the step of:
limiting lubricant flow, with a check valve, through the bleed passage in a direction from the scavenge passage to the reservoir.

* * * * *